May 24, 1960

A. GJERDE 2,937,672

ADJUSTABLE MOTOR-DRIVEN SAW

Filed Sept. 30, 1958

INVENTOR
ARNE GJERDE

BY Toulmin & Toulmin

ATTORNEYS

May 24, 1960  A. GJERDE  2,937,672
ADJUSTABLE MOTOR-DRIVEN SAW
Filed Sept. 30, 1958  2 Sheets-Sheet 2

INVENTOR
ARNE GJERDE

BY Toulmin & Toulmin
ATTORNEYS

United States Patent Office 2,937,672
Patented May 24, 1960

2,937,672

ADJUSTABLE MOTOR-DRIVEN SAW

Arne Gjerde, 4 Tajeveien, Skui, V. Baerum, near Oslo, Norway

Filed Sept. 30, 1958, Ser. No. 764,310

Claims priority, application Norway Oct. 17, 1957

5 Claims. (Cl. 143—6)

The present invention relates to a universal under-bench motor-driven saw, more particularly, to the table structure for such a saw which comprises an improvement in the mounting of the rotatable disc on the table plate so that the disc is normally carried by the under structure of the table.

There are several known types of under-bench saws, but the present invention pertains to a particular type of saw which comprises a table having a frame structure with a circular opening in the table plate. A structure comprising a rotatable disc is rotatably mounted in said opening, and there is a saw-blade slot formed in said disc. A supporting member is pivotally mounted in the bottom portion of the table frame structure and is coaxial to the disc. A supporting frame is pivotally mounted below the table plate and pivots about an axis extending diametrically with respect to the disc and in the direction of the saw-blade slot. Means are provided to position the supporting frame with respect to the supporting member. A mounting frame is pivotally mounted on the supporting frame for movement about a pivotal axis at right angles to the pivotal axis of the supporting frame. The bearing for the saw spindle and a driving motor which is drivingly connected to the saw spindle, are both mounted upon the mounting frame. Structure is provided for moving the mounting frame up and down and to be fixed with respect to the supporting frame.

This particular type of motor driven saw has the advantage that it can be used both for ripping and for cross-cutting in vertical and inclined planes, and that the saw blade can be positioned laterally, transversely, or obliquely in the horizontal plane. As a result, it is possible to make oblique cuts for a predetermined position of the work. Further, a saw of this kind can be constructed so as to have little weight and to have such dimensions that it can be readily carried by two persons through doorways in buildings. Accordingly, these characteristics enable this type of saw to be excellently suited for use in building construction.

A sufficiently rigid construction has been obtained in such known saws due to the fact that the table is rectangular with one leg in each corner. However, this structure may make the operation somewhat cumbersome, since the legs may obstruct the operation when the operating lever is in an inclined position in the horizontal plane and is to be moved up and down in a vertical or inclined plane. Also, impeded operation may occur when the disc is to be turned, since care has to be taken that the lever does not collide with the legs of the table.

The present invention avoids this disadvantage but comprises a stable and rigid structure by interconnecting the supporting member and the rotatable disc by a yoke with upwardly projecting legs which extend on either side of the supporting and mounting frames and are rigidly fixed to the disc at their upper ends. Further, the table is constructed without legs or other connections between the table plate and the bottom frame within a swinging range of the operating lever of at least 180° in the horizontal plane. In spite of the fact that with this construction the table plate is only carried on one side of a vertical plane through the center of the rotatable disc, the rotatable structure will be sufficiently rigid and will not adopt inclined positions under loads from the work or heavier objects, if any, that may be placed on the disc. The disc has a direct support through the yoke from a member journaled in the bottom frame and will thus relieve the table frame from bending stresses. The rotatable disc is normally supported by the supporting member through the yoke and has only a loose support in an annular bearing on the bottom side of the table plate. Further, at the edge of the opening the table plate may be arranged to project inwards on top of a bearing ring fixed to the bottom side of the disc, so that an excess load on the fixed table plate will also be transmitted to the bottom frame through the yoke, which thus will relieve the table legs from excessive bending stress.

The arresting of the supporting frame in various inclined positions in the vertical plane may, when using the invention, conveniently be obtained by forming one leg of the yoke with an arcuate portion, approximately concentric to the pivotal axis of the supporting frame and along which the supporting frame can be adjusted.

When using the invention, the operation of the saw may be further facilitated by making the free edge of the table plate extend along an arc substantially concentric to the opening so as to permit the handle of the operating lever to be lifted above the plane of the table plate within a swinging range in the horizontal plane of at least 180°.

It is the principal object of this invention to provide an improved universal under-bench motor-driven saw.

It is a further object of this invention to provide a universal motor-driven saw wherein the table plate is connected to the table frame structure so as to form a cantilever beam by which the table plate is rigidly supported against excessive loads thereon.

It is an additional object of this invention to provide a universal under-bench saw wherein the rotatable disc is rotatably connected to the table frame structure by a yoke so that loads applied to the disc will be transmitted directly to the frame structure of the table and not to the table plate.

It is another object of this invention to provide a universal under-bench saw having a cantilever table plate construction but wherein excessive loads applied to the table plate are transmitted to the table frame structure.

The invention will be better understood from the following description, reference being had to the drawings, which illustrate an embodiment of the saw.

Several details, such as protecting caps, cleaving knife, guides for the work, etc., have been omitted for the sake of clarity in describing and illustrating the present invention, but it is to be understood that such details and other modifications which are necessary to do specific tasks can be attached to the saw described as this invention.

Figure 1:
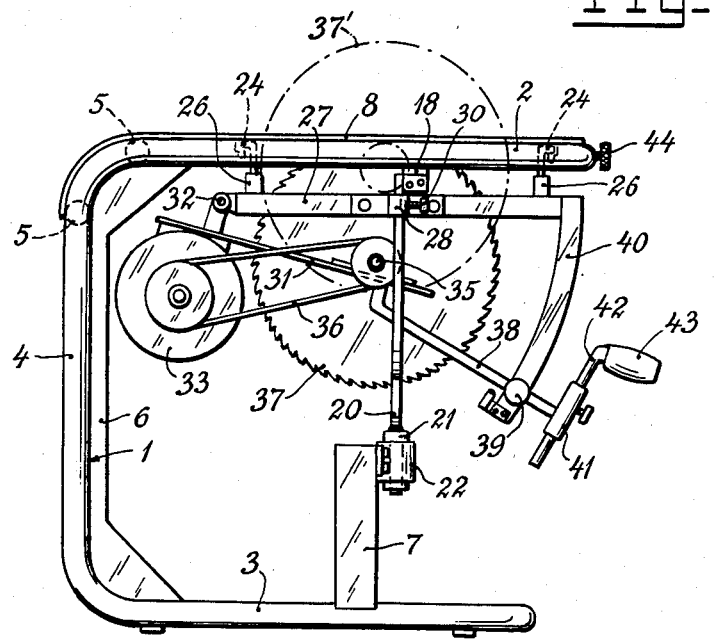
Figure 1 is a side elevational view of the universal under-bench saw of this invention.

In the embodiment shown the table frame is composed of a frame 1 of metal tubing which has been bent so as to form a closed loop and bent twice at right angles in the vertical plane, so that in side view it has the shape of a U lying on one side as shown in Figure 1. Two horizontal U-shaped portions 2 and 3 are formed, which are interconnected by two legs 4 at one end. The loop 1 is shown to be reinforced by cross braces 5, vertical reinforcing plates 6 on the inner side of the legs, and a transverse bracket 7 which forms part of the bottom frame of the table.

The table plate 8 is welded to the top of the U-shaped portion 2, which at its forward end extends along a circular arc of 180°, and carries on its bottom side immediately inside the portion 2 a ring 9. The ring 9 is riveted to the plate 8 and extends concentrically to the said arcuate end and along the border of the circular opening 10 provided for the circular rotatable disc 11. Along the opening 10, the table plate 8 has segmental cut-away portions 12 leaving inwardly projecting intermediate portions 13. Directly under these latter portions 13, the ring 9 has corresponding segmental portions 14 projecting inwards from its bottom edge so that scobs, dust or the like entering the opening 10 can fall freely down through the cut-out portions 12 and the intermediate spaces between the projections 14.

The rotatable disc 11 is provided with a diametrical saw-blade slot 15 and extends flush with the table plate 8. The disc is welded at its periphery to a bearing ring 16 on its bottom side, which ring has a slightly greater outer diameter than the disc and has such a cross-sectional shape that it projects into the space between the bottom side of the projections 13 and the top of the projections 14 and at the same time is guided by the latter projections with a small radial clearance. Substantially in a diametrical plane normal to the slot 15, two downward projections 18 and 19 are welded to the ring 16 and have bolted thereto the upwardly projecting legs of a yoke 20, which extends substantially in the said plane. The bottom of the yoke 20 is welded to a pivot 21, which is supported axially, and pivoted coaxially to the opening 10, in a vertical bearing 22 attached to the bracket 7. The disc 11 with the yoke 20 and the ring 16 is therefore supported through the pivot 21 from the bearing 22. The ring 16 at the same time is loosely guided in the ring 9 and likewise capable of receiving vertical loads on the table plate 8 through the inward projections 13.

At either end of a diameter substantially coinciding with the slot 15, the ring 16 has a radial hole 23 located immediately below the disc 11. Each hole 23 forms a bearing for a pivot 24 formed by an outwardly projecting end portion of a pin 25. The pins 25 are attached in and project upwards from projections 26 on top of a flat iron supporting frame 27. The frame 27 extends to one side from the projections 26 and has on its outer side a narrow flat iron loop 28 bolted thereto. The loop 28 extends on either side of an arcuate portion 29 of one leg of the yoke 20. The arcuate portion 29 is largely concentric to the pivots 24, and the loop 28 can be arrested in fixed positions on this portion 29 by means of a screw 30, so that the supporting frame 27 can be adjusted to various angular positions in a vertical plane at right angles to the pivots 24 and hence to the slot 15.

At the rear end of the supporting frame 27 a mounting frame 31 is pivoted for movement about an axis 32 extending at right angles to the pivotal axis of the supporting frame as defined by the pivots 24. On the mounting frame 31 the driving motor 33 and the bearing 34 for the saw-blade spindle 35 are mounted in substantially balanced relation and in parallel positions to the axis 32. The spindle 35 is driven from the motor through a belt drive 36 (shown in Figure 1) and carries the saw blade 37 in a plane through the axis for the pivots 24, so that the blade 37 can be swung up and down through the slot 15, which is made large enough to give room for the saw blade irrespective of the angular position of the supporting frame 27 about the pivots 24.

At its forward end the mounting frame 31 carries an outwardly projecting lever 38, which can be attached by means of a screw 39 to an arcuate rail 40 welded to the forward end of the supporting frame 27 and extending concentrically about the axis 32 and through a hole in the lever 38. In a sleeve 41 on the extremity of the lever 38 an upwardly projecting shaft 42 for an operating handle 43 is mounted. When the screw 39 is loose, the saw blade 37 can be swung up and down by means of the handle 43 for cross-cutting operations. The mounting frame 31 with the saw blade and the spindle and hub thereof is capable of being moved upwards through the supporting frame 27 to the extreme upper position of the saw blade indicated in dash-and-dot lines at 37' in Figure 1, in which position the hub is close to the bottom side of the disc 11. Due to the concentric arrangement of the frame portion 2, this position is possible in all angular positions of the slot 15 in the horizontal plane within an angular range of the disc 11 of more than 180°. The conditions of operation are at the same time extremely convenient, since the shaft 42 is placed so far out on the lever 38 that it comes clear of the arcuate frame portion 2 and likewise of an arresting screw 44 for the bearing ring 16, threaded in the ring 9. Thus, the handle 43 can be lifted above the top plane of the table and a rotation of the disc 11 with the supporting and mounting frames can be effected after loosening the screw 44 and tightening the screw 39, even in the lifted position of the handle 43.

Figure 2:
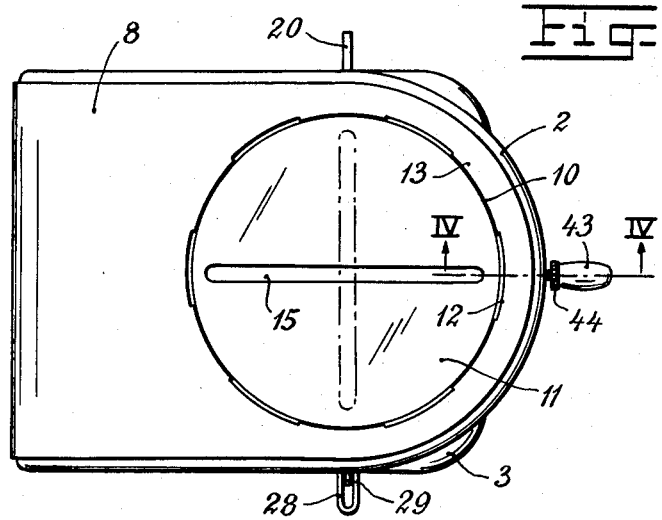
Figure 2 is a top plan view of the saw illustrated in Figure 1.
Figure 3:
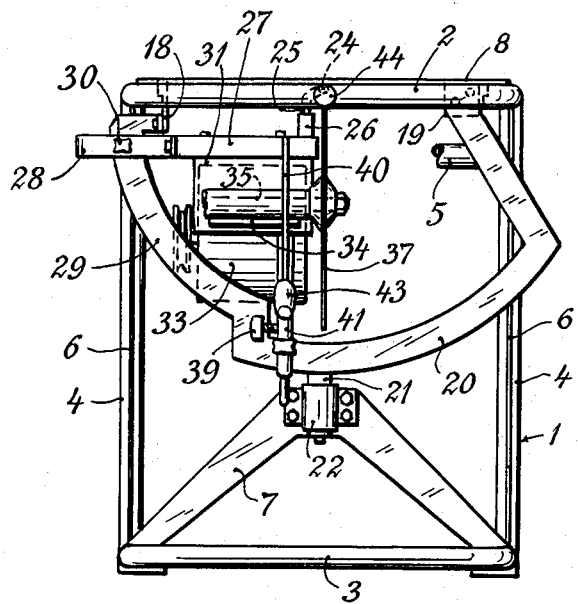
Figure 3 is a front elevational view of the saw illustrated in Figures 1 and 2.
Figure 4:
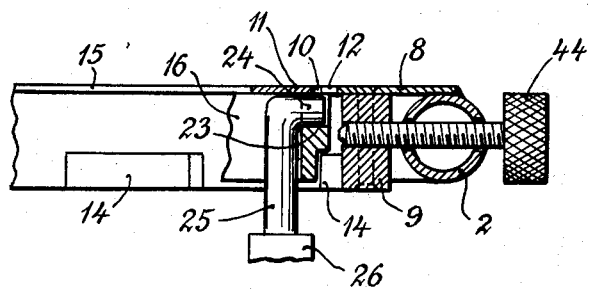
Figure 4 is a sectional view on a larger scale, taken along the line IV—IV in Figure 2.

It will be seen that the handle 43, the arresting loop 28, and also the diametrically opposite leg of the yoke 20, which has to give room for the saw blade 37 with protecting caps, if any, in all inclined positions, will project outside the horizontal outline of the table in the mean position shown, of the slot 15, in which the latter extends longitudinally with respect to the table. However, this does not prevent the saw from being carried through any doorways larger than the width of the table, since the entire yoke 20 as well as both the loop 28 and the handle 43, may be accommodated within the width dimension of the table in a lowered position of the handle if the disc 11 is turned about 45° in the horizontal plane from the position shown in Figure 2.

Thus it can be seen that the present invention discloses an under-bench saw which allows complete freedom of movement of the mounting and supporting frames but which is adapted to sustain heavy loads applied to either the discs or to the table plate.

It will be understood that this invention is susceptible to modification in order to adapt it to different usages and conditions, and, accordingly, it is desired to comprehend such modifications within this invention as may fall within the scope of the appended claims.

What I claim is:

1. An adjustable under-bench saw comprising a table structure having a table plate with a circular opening therein, a bottom frame structure and leg means rigidly supporting said table plate upon said bottom frame structure and extending only on one side of vertical plane passing through the center of said opening, a disc rotatably mounted in said circular opening, there being a saw-blade slot in said disc, supporting means rotatably mounted on said bottom frame structure beneath said table plate and with its axis of rotation coaxial with said disc, a supporting frame pivotally mounted on said disc below said table plate and having its pivot axis substantially coinciding with said saw-blade slot, a mounting frame pivotally mounted on said supporting frame and having its pivot axis at right angles to the pivot axis of said supporting frame, a saw blade rotatably mounted on said mounting frame with the axis of the saw blade being parallel to the pivot axis of the mounting frame, a drive motor on said mounting frame and drivingly connected to said saw blade, a yoke interconnecting said disc and said supporting means and having legs extending upwardly on either side of said mounting and supporting frames and rigidly connected to said disc at their upper ends, means on said supporting frame receiving a leg of said yoke to position selectively said supporting frame, and means on said supporting frame to position selectively said mounting frame.

2. An adjustable under-bench saw as claimed in claim 1, with one leg of the yoke having an arcuate portion substantially concentric to the pivotal axis of the supporting frame and along which the supporting frame can be adjusted.

3. An adjustable saw-bench saw as claimed in claim 1, with there being an annular bearing in the lower portion of said circular opening to loosely guide said rotatable disc, the said disc being normally carried by said supporting means through said yoke.

4. An adjustable under-bench saw as claimed in claim 3 and further comprising a bearing ring attached to the disc so as to transfer any excessive load on the table plate to the yoke.

5. An adjustable under-bench saw comprising a table structure having a frame structure and a table plate with a circular opening therein, said circular opening being adjacent one end of said table plate and the other end of said table plate being rigidly connected to said frame structure, a disc rotatably mounted in said circular opening, there being a saw-blade slot in said disc, a supporting means rotatably mounted on said frame structure beneath said table plate and with its axis of rotation coaxial with said disc, a supporting frame pivotally mounted on said disc below said table plate and having its pivot axis substantially coinciding with said sawblade slot, a mounting frame pivotally mounted on said supporting frame and having its pivot axis at right angles to the pivot axis of said supporting frame, a saw blade rotatably mounted on said mounting frame with the axis of the saw blade being parallel to the pivot axis of the mounting frame, a drive motor on said mounting frame and drivingly connected to said saw blade, a yoke interconnecting said disc and said supporting means and having legs extending upwardly on either side of said mounting and supporting frames and rigidly connected to said disc at their upper ends, an operating lever extending from said mounting frame and having a handle on the end thereof, means on said supporting frame to receive a leg of said yoke to position selectively said supporting frame, means on said supporting frame to receive said operating lever and to position selectively said operating lever to adjust said mounting frame, said one end of said table plate forming an arc substantially concentric to said circular opening so that the handle of the operating lever can be lifted above the plane of the table plate within a swinging range of at least 180° in the horizontal plane.

References Cited in the file of this patent
UNITED STATES PATENTS

| | | |
|---|---|---|
| 2,175,907 | Mickow | Oct. 10, 1939 |
| 2,208,582 | Hollister | July 23, 1940 |
| 2,719,547 | Gjerde | Oct. 4, 1955 |